(12) United States Patent  
Moraites

(10) Patent No.: US 7,696,919 B2  
(45) Date of Patent: Apr. 13, 2010

(54) BULLET APPROACH WARNING SYSTEM AND METHOD

(75) Inventor: Stephen C. Moraites, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 145 days.

(21) Appl. No.: 12/033,186

(22) Filed: Feb. 19, 2008

(65) Prior Publication Data

US 2009/0174589 A1    Jul. 9, 2009

Related U.S. Application Data

(60) Provisional application No. 61/018,768, filed on Jan. 3, 2008.

(51) Int. Cl.
G01S 7/42 (2006.01)
G01S 13/00 (2006.01)
G01S 13/58 (2006.01)
G01S 13/08 (2006.01)

(52) U.S. Cl. ............................. 342/14; 342/27; 342/53; 342/56; 342/61; 342/95; 342/107; 342/134; 342/139

(58) Field of Classification Search ............. 342/13–15, 342/20, 27, 28, 53, 56, 61, 67, 94, 95, 107, 342/113, 118, 134, 139, 147–158
See application file for complete search history.

(56) References Cited

U.S. PATENT DOCUMENTS

| | | | | |
|---|---|---|---|---|
| 3,320,420 A * | 5/1967 | Paglee et al. | ................. | 250/342 |
| 3,982,713 A * | 9/1976 | Martin | ........................ | 244/3.1 |
| 4,975,705 A * | 12/1990 | Gellekink et al. | ............... | 342/52 |
| 5,229,540 A * | 7/1993 | Schabdach et al. | .......... | 89/41.03 |
| 5,574,458 A * | 11/1996 | Tran | ............................. | 342/13 |
| 5,606,500 A * | 2/1997 | Tran | ............................. | 701/1 |
| 5,757,310 A * | 5/1998 | Millward | ..................... | 342/95 |
| 5,822,713 A * | 10/1998 | Profeta | ........................ | 701/302 |
| 6,177,902 B1 * | 1/2001 | Huntley et al. | ................. | 342/20 |
| 6,215,731 B1 * | 4/2001 | Smith | ........................... | 367/128 |
| 6,422,508 B1 * | 7/2002 | Barnes | ....................... | 244/3.16 |
| 6,545,632 B1 * | 4/2003 | Lyons et al. | ................... | 342/45 |
| 6,717,543 B2 * | 4/2004 | Pappert et al. | ................. | 342/13 |
| 6,980,151 B1 * | 12/2005 | Mohan | ........................ | 342/13 |
| 7,104,496 B2 * | 9/2006 | Chang | ......................... | 244/3.19 |
| 7,158,076 B2 * | 1/2007 | Fiore et al. | ................... | 342/129 |
| 7,190,304 B1 * | 3/2007 | Carlson | ........................ | 342/62 |
| 7,202,809 B1 * | 4/2007 | Schade et al. | ................. | 342/67 |

(Continued)

Primary Examiner—Thomas H Tarcza
Assistant Examiner—Peter M Bythrow
(74) Attorney, Agent, or Firm—Burr & Brown

(57) ABSTRACT

A system and method for warning a helicopter of an approaching bullet using existing sensor systems is disclosed. The disclosed method including the steps of: detecting and providing bearing information for detected small arms weapon firing locations near the helicopter, determining a detection area and detection time window for the fired bullet, determining the antennas of the RF transmitting and RF receiving systems covering the bearing of the detected weapon firing; determining a timing sequence and allocating time segments for transmitting and receiving RF signals during the detection time window, commanding the RF emitting system to emit and the RF receiving system to receive RF signals during their allocated time segments, processing RF signals received and determining whether reflected RF signal pulses from the emitted RF signal pulses are present, and outputting a warning where reflected RF signal pulses are detected.

20 Claims, 9 Drawing Sheets

U.S. PATENT DOCUMENTS

| | | | |
|---|---|---|---|
| 7,205,932 B2 * | 4/2007 | Fiore .......................... | 342/133 |
| 7,236,122 B2 * | 6/2007 | Pappert et al. ................ | 342/67 |
| 7,425,916 B2 * | 9/2008 | Stevens, Jr. ................ | 342/13 |
| 2003/0117309 A1 * | 6/2003 | Pappert et al. ................ | 342/13 |
| 2006/0071847 A1 * | 4/2006 | Fiore et al. .................. | 342/107 |
| 2007/0040062 A1 * | 2/2007 | Lau et al. .................... | 244/3.16 |
| 2007/0125951 A1 * | 6/2007 | Snider et al. ............ | 250/363.03 |
| 2008/0111728 A1 * | 5/2008 | Stevens ....................... | 342/14 |

* cited by examiner

Typical Jammer Transmitter Antenna Patterns
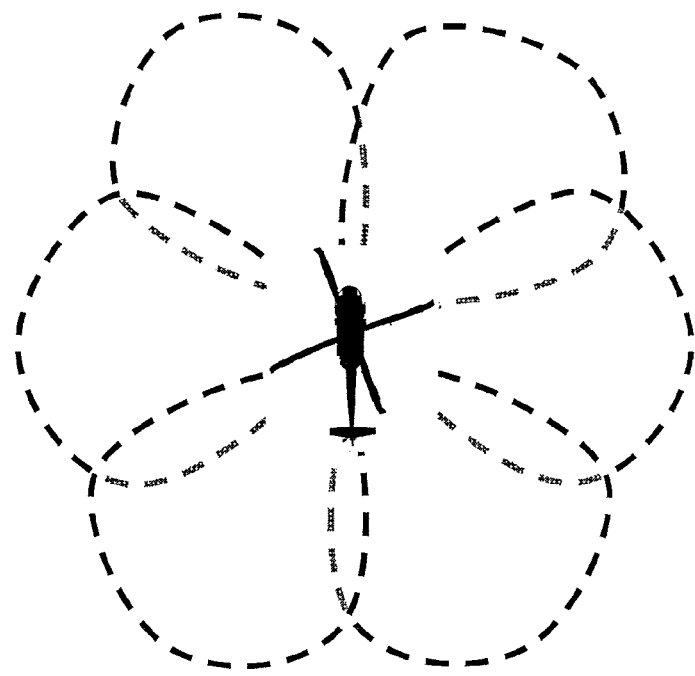
Typical Radar Warning Antenna Patterns
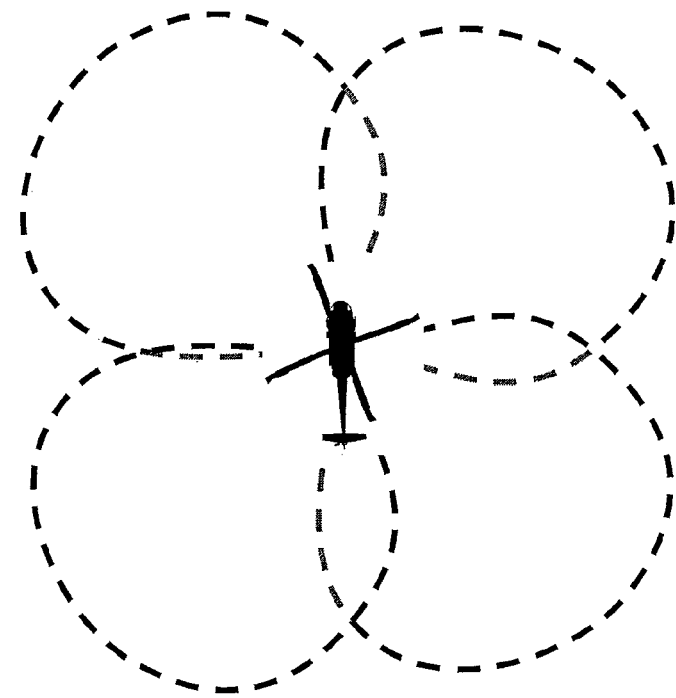
Fig. 4

N pulses are transmitted, received from the bullet,
and integrated to increase the probability of detection.

- Minimum detection distance is the standard distance to avoid pulse eclipsing $d_{min} = c\tau/2$ Figure 8 Detection Range and Detection Opportunities For Two Projectiles

BULLET APPROACH WARNING SYSTEM AND METHOD

FIELD OF INVENTION

The present invention relates to a system and method for detecting the presence of small arms weapons being fired in the vicinity of an aircraft, such as a helicopter, and determining whether the projectiles fired by the small arms weapons are targeted at the aircraft. More specifically, the present invention modifies existing sensor systems, such as electronic warfare equipment, to detect weapon firings and determine whether the fired bullets are approaching the aircraft, and if so provide a warning to the crew.

BACKGROUND OF THE INVENTION

The operational environment for a helicopter may include several different types of threats including but not limited to other aircraft, missiles and small arms fire. To operate and survive in this potentially hostile threat environment, many helicopters are equipped with a suite of advanced sensor systems. For example, many helicopters are equipped with electronic warfare (EW) equipment, such as electronic support measures (ESM) or Radar Warning Receiver (RWR) systems, which detect radio frequency (RF) signals emitted by other aircraft and ground-based systems, such as radars, and determine the characteristics of the detected RF signal (e.g., frequency, pulse repetition frequency (PRF), pulse width (PW), etc.). These EW systems may also determine the RF emitter type and operating mode of the RF emitter and also provide visual or aural alerts or warnings to the crew indicating whether the detected RF signal is associated with a potential threat to the helicopter. Many of these electronic warfare systems can also detect changes in the RF signal characteristics that indicate a change in the operating mode of the RF emitter, such as radar changing from a search mode to acquisition/targeting mode, indicating that a weapon launch is imminent.

Many helicopters are also equipped with one or more countermeasure systems, such as RF jamming systems. Installed RF jamming systems protect the helicopter from radar-guided weapons, by transmitting RF signals to disrupt the reception of the RF signal used for guidance, for example. Coordinating the transmission of RF jamming signals with helicopter maneuvers causes the radar guidance system of the approaching missile to lose its radar lock (e.g. radar track) on the helicopter causing the missile to miss the helicopter. RF jamming systems can also be used in conjunction with chaff and flare countermeasure systems.

Bullets from weapons pose a serious threat to helicopters because helicopters operate at low altitudes and frequently hover or fly at low speed, thereby creating targets within the range of many small arms weapons. The bullets fired by small arms, such as AK-47s, for example, and small projectiles fired from man portable weapons, such as RPGs, for example, can cause significant damage to helicopters, causing system failures and the loss of the helicopter and either killing or maiming the aircrew.

However, in many situations in the helicopter operating environment, small arms fire may be present that is directed at targets other than the helicopter, including weapons fired by friendly force or law enforcement personnel. These weapon firings pose no threat to the helicopter or aircrew. However, existing EW systems do not detect or provide any indications to the aircrew of the presence of small weapon-fired ballistic projectiles proximate to the helicopter.

Hostile Fire Indicating (HFI) systems have been recently added to the equipment installed on many helicopters. HFI systems detect the presence of weapons being fired in the vicinity of the aircraft. HFI systems detect the firing of bullets or small projectiles either with optical sensors that detect the muzzle flash associated with the firing of a weapon, or with acoustic pressure sensors, such as piezoelectric transducers that detect the disturbance in the atmosphere created by the shock wave generated by the bullet or small projectile moving through the air. However, HFI systems are strictly limited to detecting the presence of small arms firing activity in the vicinity of the helicopter and providing a bearing of the location of the detected small arms firing from the helicopter. HFI systems cannot determine if the detected small arms fire is directed at (i.e., targeting) the helicopter or is directed at another target.

With the existing onboard systems, the aircrew is frequently unaware of small arms fire that is directed at the helicopter. These projectiles may be passing close to or even hitting the aircraft with insufficient impact to be noticeable to the aircrew. As a result, helicopters have been returning from operations in dangerous environments with significant damage from small arms fired projectiles (e.g., bullets) with the aircrew unaware of their helicopter being targeted and damaged by the small arms fire.

A system that warns the aircrew when the small arms fire is targeting or being directed at the helicopter would significantly increase the survivability of the helicopter and aircrew in potentially hostile environments, including urban areas which provide many sheltered or concealed locations from which individuals can engage a helicopter in relative safety.

However, the space available for adding any new equipment to a helicopter that is not replacing an existing system is very limited and adding new equipment will increase cost of the helicopter, not to mention the weight, thereby limiting the effective flying range and payload of the helicopter. Additionally, since certain helicopter operations, such as combat search and rescue (CSAR), require helicopters to have significant range and endurance capabilities, increasing the weight of the helicopter may make the helicopter unsuitable for these types of operations. Therefore, adding additional equipment to existing aircraft systems to provide a bullet approach warning to the aircrew is not desirable due to the additional expense and negative impact on the range and payload capabilities of the helicopter, as well as the general lack of space within the helicopter.

Thus, what is needed is a system and method for warning the aircrew when ballistic projectiles, such as bullets from small arms weapons, are directed at the helicopter using existing sensors already installed on the helicopter.

SUMMARY OF THE INVENTION

The present invention provides the aircrew the ability to not only positively detect the firing of small arms weapons in the vicinity of the helicopter, but to also determine whether the projectiles associated with the detected small arms firings are approaching the helicopter and, therefore, are a threat to the helicopter. The present invention uses existing equipment already installed on the aircraft to provide this bullet approach warning (BAW) functionality. The existing aircraft sensors, such as ESM, RWR or integrated EW systems, are modified to perform the BAW functionality in addition to their primary functions.

More specifically, the system and method of the present invention provides a new BAW functionality that enhances the survivability of the helicopter and aircrew by combining, integrating and controlling existing electronic warfare (EW) equipment to operate in a new and novel manner. In effect, the present invention receives inputs from existing helicopter navigation systems and weapon firing detection systems, such as a Hostile Fire Indicator (HFI) system, and determines whether the detected small arms fire is targeting the helicopter by integrating and controlling the transmitting capability of the existing RF jamming system and the signal receiving capability of the Radar Warning Receiver or ESM system to, in effect, create a bi-static radar capability from the existing EW systems. The BAW functionality of the present invention is capable of detecting bullets of at least 5.56 mm and small projectiles, such as RPGs, at a distance from the helicopter, and provides a warning message when a bullet (hereinafter the term bullet refers to any projectile fired from man-portable small arms weapons) is approaching the helicopter. The present invention provides positive detection of approaching bullets from detected small arms weapon firings that are targeted at the helicopter, including bullets that do not strike the aircraft. In these situations, the bullet approach warning of the present invention provides a warning to the aircrew of the small arms weapons targeting the helicopter before damage and injuries occur.

The transmitted signal from the RF jamming system and the RF receiving capabilities of the existing EW systems are integrated to create a BAW detection area, or envelope, in the area surrounding the helicopter. The present invention uses the receiving capabilities of the existing EW systems to detect any bullets entering or passing through the BAW detection area (i.e., approaching the helicopter through the BAW detection area) from the direction of the detected weapon firing, and determines whether the bullets are approaching (targeting) the helicopter, or are targeted at another target.

Where the BAW functionality determines that the bullets are approaching the helicopter, the system and method of the present invention outputs a warning message that can be used to warn the aircrew of the danger. The system and method of the present invention can also be used to automatically initiate any countermeasure systems available on the helicopter.

BRIEF DESCRIPTION OF DRAWINGS

FIG. 4 depicts nominal overlapping transmitting antenna coverage sectors and nominal overlapping receiving antenna coverage sectors that provide 360 degrees of coverage around the helicopter;

DETAILED DESCRIPTION OF THE INVENTION

Figure 1:
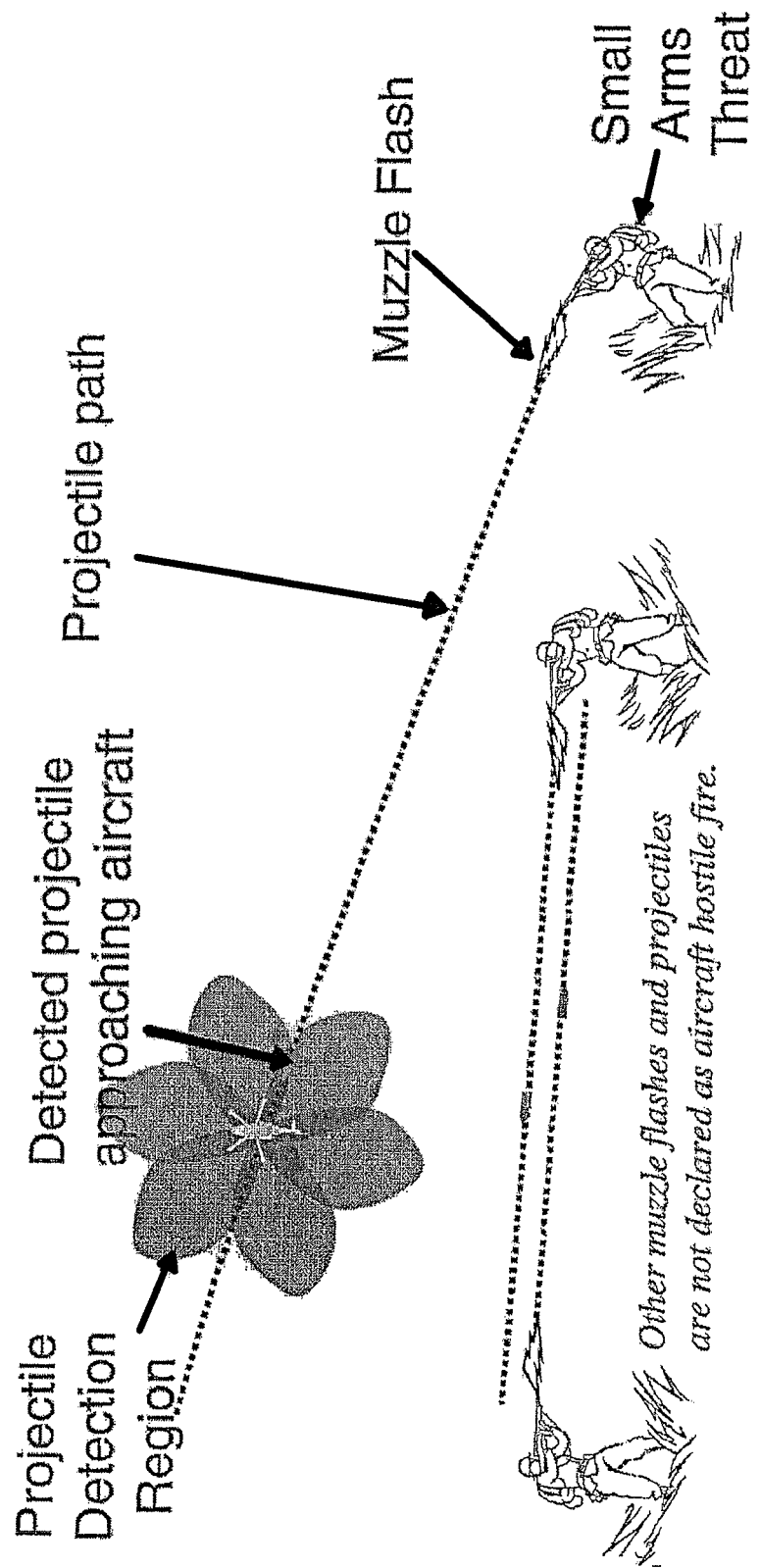
FIG. 1 depicts a helicopter operating environment in which small arms fire is present and some of the small arms fire is targeted at the helicopter.

The system and method of the present invention uses existing EW equipment in a novel way to provide a BAW capability, that enhances the survivability of the helicopter and aircrew in hostile environments by detecting the presence of small arms weapon firings, determining whether the helicopter is the intended target of the bullet(s) from the detected small arms weapon firings and, where the helicopter is determined to be the intended target, providing a warning to the aircrew of the danger that enables the aircrew to take evasive actions, as necessary. As shown in FIG. 1, the BAW functionality determines whether the detected small arms fired projectiles are approaching (targeting) the helicopter, or are targeted at another target.

BAW Functionality

Figure 7:
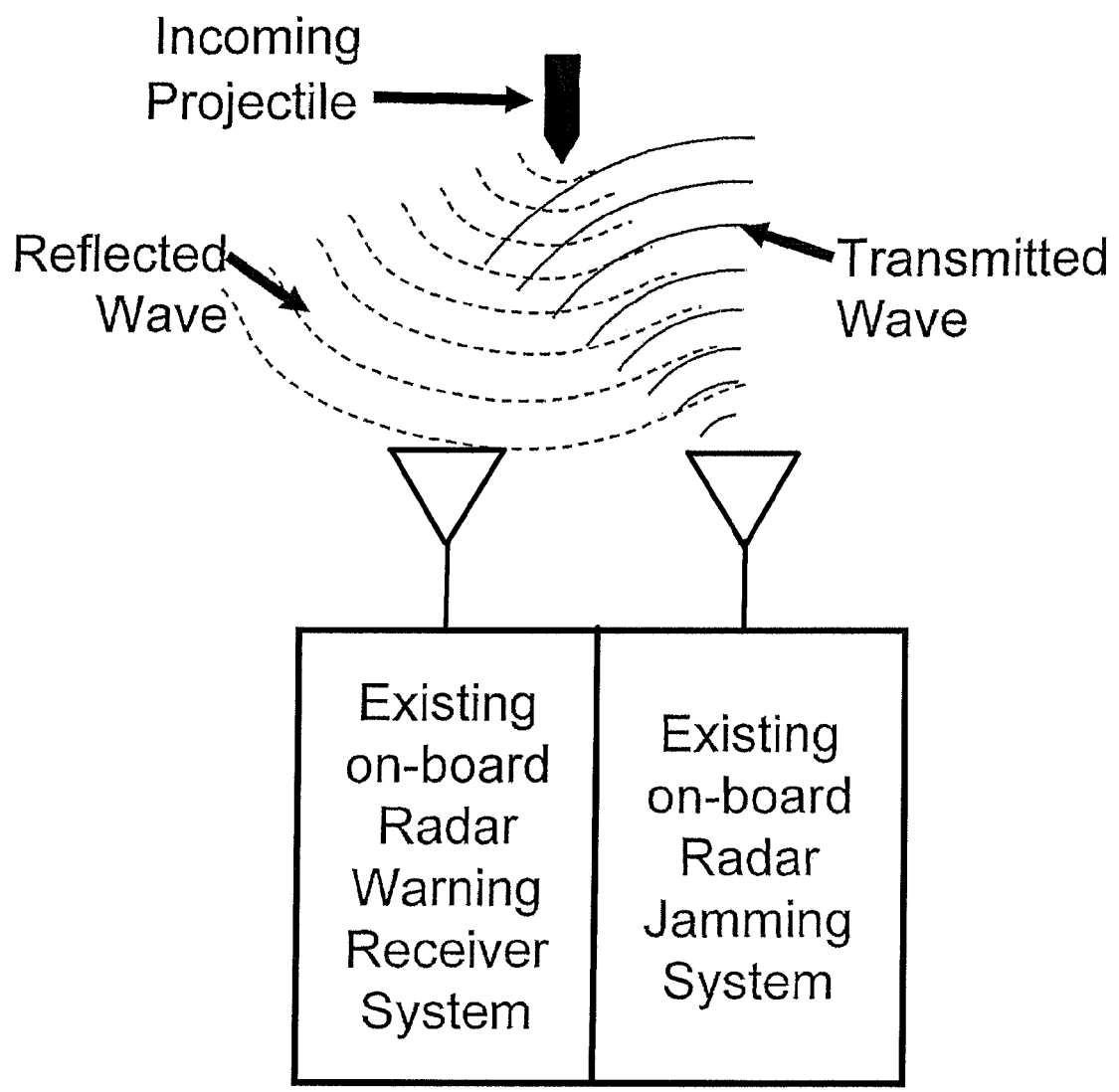
FIG. 7 depicts the bi-static radar capability of the BAW functionality.

By combining, integrating and controlling the transmitting capability of the existing RF jamming system and the signal receiving capability of the existing RF receiving systems, such as a Radar Warning Receiver (RWR) system, in a new and unique manner, the system and method of the present invention, in effect, creates a bi-static radar capability as shown in FIG. 7, of the disclosed BAW functionality, without adding any new or dedicated equipment to the helicopter. The bi-static radar capability of the BAW functionality has sufficient sensitivity to detect bullets of 5.56 mm and larger. The detection range of the bi-static radar detection capability of the BAW functionality is sufficient to provide a warning to the aircrew of the danger and varies based on the size (radar cross section) of the projectile.

One of the key and novel features of the present invention is that it provides the BAW capability without replacing any existing helicopter systems or adding any additional hardware or weight to the helicopter airframe. Thus, the present invention provides a unique functional capability that enhances aircraft and aircrew survivability without any adverse affect on the range and endurance capabilities of the helicopter airframe.

Figure 2:
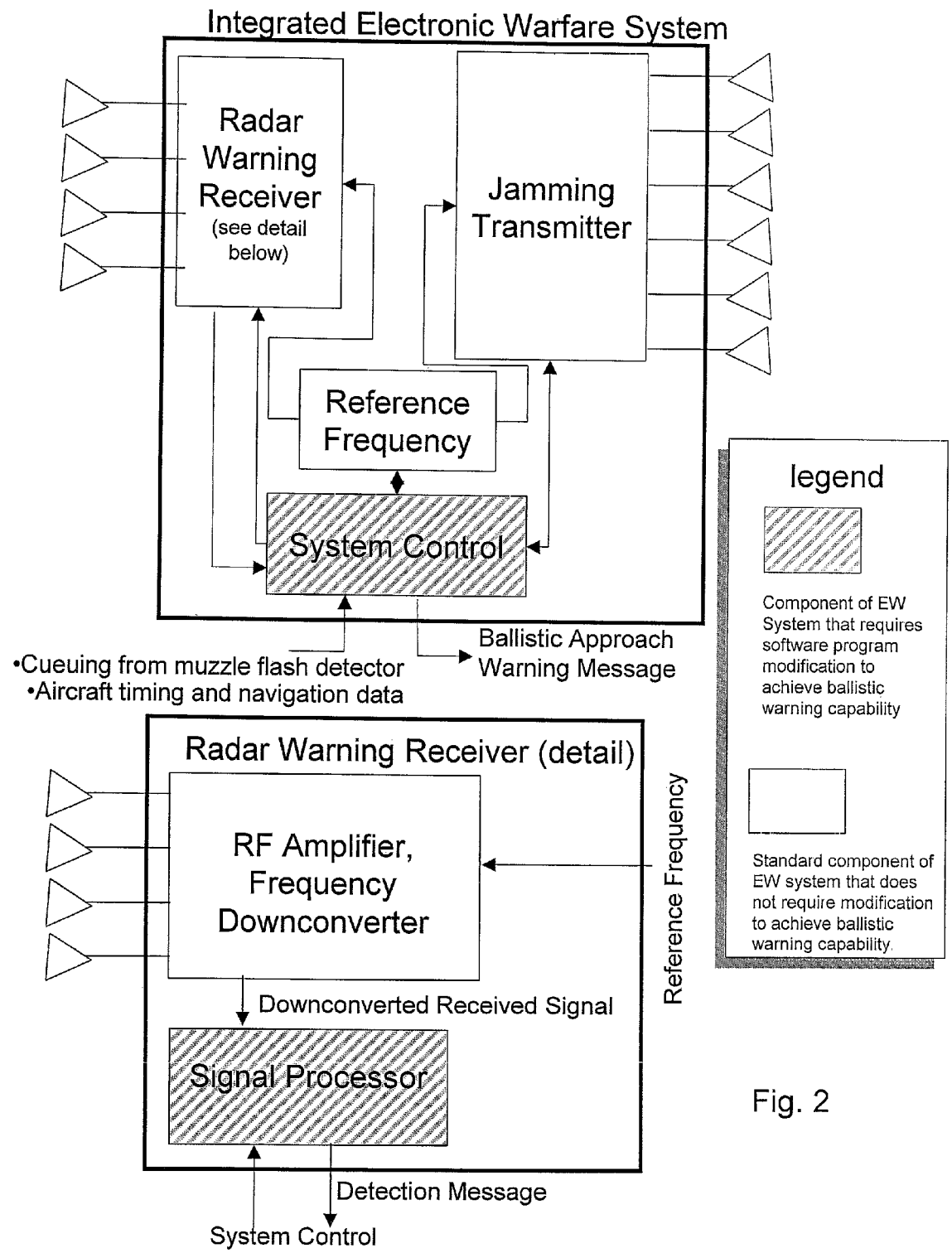
FIG. 2 depicts a first embodiment of the present invention having an integrated EW system for the RF jamming and RWR systems.
Figure 3:
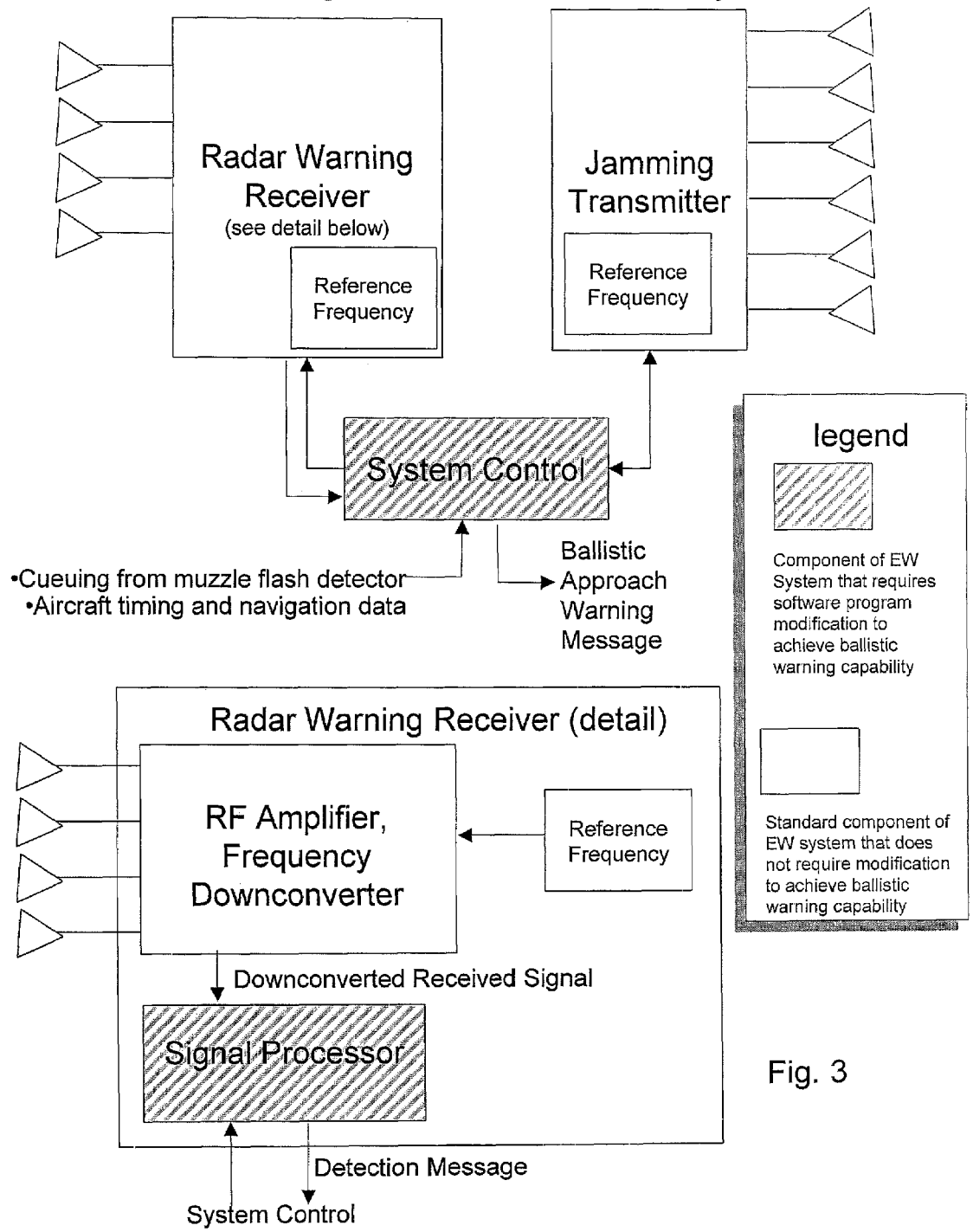
FIG. 3 depicts a second embodiment of the present invention having an RF jamming system and separate RWR systems.

In one embodiment of the present invention, shown in FIG. 2, the existing aircraft systems used to provide the BAW functionality include a Hostile Fire Indicator (HFI) system, a radio frequency emitting system, such as an (RF) jamming system, and an RF signal detecting system, such as a Radar Warning Receiver (RWR). The present invention also includes BAWS system control software. The BAWS system control software provides the necessary command and control structure to integrate the functional capabilities of the existing RF jamming and RWR systems. As shown in FIG. 2, the RF jamming system and RWR system installed onboard the helicopter can be a single integrated system. In another embodiment of the present invention, the RF jamming system and RWR system are separate, as shown in FIG. 3. The specific helicopter sensor systems shown in FIGS. 2 and 3 are provided as examples of specific embodiments of the present invention. The system and method of the present invention can combine various RF transmitting and RF receiving systems and is not limited to the specific helicopter sensor systems discussed.

The primary functions of the existing aircraft systems of the first embodiment of the present invention, an HFI system, an RF jamming system and an RWR system and how the existing systems are modified and functionally integrated by the present invention to provide BAWS functionality are discussed below.

Hostile Fire Indicator System (HFI)

The primary function of the existing hostile fire indicator (HFI) system is to detect the firing of weapons in the vicinity of the aircraft. The HFI system may use optical sensors, such as infrared cameras, to detect the muzzle flash associated with the firing of a weapon, or may use pressure/acoustic sensors, such as piezoelectric transducers, for example, to detect the shock waves radiating through the atmosphere from the projectile fired by the weapon flying through the atmosphere along a ballistic trajectory towards its intended target.

When the HFI system detects the firing of a small arms weapon, the HFI system outputs a warning to a pilot that small arms fire has been detected in the vicinity of the aircraft and provides the bearing (direction) relative to the helicopter from which the detected small arms fire originated. The bearing accuracy of HFI systems using pressure/acoustic sensors is approximately +/−20 degrees of the true bearing. The bearing accuracy of HFI systems using optical detection sensors, such as infrared cameras, to detect the muzzle flash of a weapon is at least +/−10 degrees of the true bearing of the muzzle flash. Some of the newer HFI systems using optical detection sensors provide bearing information that is within +/−1 degree of the true bearing.

In the embodiments of the present invention, shown in FIGS. 2 and 3, the HFI system is used to detect the small arms weapon firing (its existing primary function), queue or initiate the BAW functionality, and provide bearing information for the detected small arms weapon firing to the BAW system control software. In this embodiment, the output of the HFI system is used to automatically queue or initiate the BAW functionality of the system and method of the present invention.

By using the HFI system to automatically initiate the BAW functionality, RF emissions associated with the BAW functionality are minimized to the short time period associated with the flight (i.e., ballistic trajectory) of the bullet fired by the small arms weapon. In situations where the automatic initiation of the BAW functionality is not desired, the aircrew can disable the BAW functionality using the existing controls and displays of the aircraft.

In other embodiments, different methods of queuing or initiating the BAW functionality are used. In one embodiment, the BAW functionality is manually initiated by an operator selecting the BAW functionality using the existing controls and displays of the aircraft. In these embodiments, the HFI system is not an integral component of the system and method of the present invention.

RF Jamming System

The primary existing function of the RF jamming system is to provide the helicopter the capability to defeat/avoid radar guided weapons, such as missiles, by disrupting or interfering with the RF signals being used to either target the helicopter or guide the weapon to the helicopter. Existing helicopter RF jamming systems include at least one transmitting antenna, which radiates a high power RF signal at one or more selected frequencies or across a band of frequencies. The existing RF jamming systems may use one or more jamming methods to disrupt or jam the desired frequency including spot jamming, noise jamming or swept continuous wave jamming, for example.

Most existing RF jamming systems typically have multiple RF transmitting antennas with each antenna covering a designated sector of the helicopter to provide 360 degrees of coverage around the helicopter. In the first embodiment of the present invention, six RF transmitting antennas are included in the RF jamming system. In this embodiment, each antenna provides coverage for a sector of a nominal 60 degrees in width and the coverage areas of adjacent antennas overlap to ensure 360 degrees of coverage for the helicopter, as shown in FIG. 4.

In the system and method of the present invention, the one or more transmitting antennas covering the sector that includes the bearing of the HFI detected weapon firing, will transmit RF signal pulses, forming a pulse train, when commanded to do so by the BAW system control software. The transmitting antennas will transmit the RF pulses at a specified periodicity for a time period specified by the BAW system control software.

The BAW functionality has minimal impact on the RF jamming system's performance of its primary functions because typically only a single RF transmitting antenna is required for the BAW functionality and the affected RF transmitting antenna can perform the BAW system control software commanded transmissions in a time-sharing or interleaved manner with its primary functions. Further, where the BAW system detects the projectile with the first RF signal transmission, the actual time required for the transmitting antenna to perform the BAW function for a bullet can be as short as 1 millisecond to detect a projectile approaching the helicopter. In a preferred embodiment, the BAW system functionality transmits an RF signal every 20 milliseconds (msec.) from the earliest arrival time until the slowest projectile has exceeded the minimum range. For example, since the velocity of a projectile will be between 500 meters/second (m/sec.) to 1000 m/sec., for a muzzle flash detected at range of 1000 meters the BAW system begins transmitting RF signals from the RF jamming system 0.9 seconds after flash detection to detect the projectile at a maximum detection range of 100 meters from the helicopter (i.e., when the fastest bullets have traveled 900 meters and are within 100 meters of the aircraft). The BAW system functionality will continue to transmit every 20 msec. until 2 seconds (sec.) after muzzle flash detection (i.e., when the slowest bullets have traveled the entire distance to the aircraft). Thus, for a maximum time period of 1.1 sec. (between 0.9 and 2 sec.) after the muzzle flash, 1 millisecond out of 20 would be used for transmitting a BAWS pulse train, leaving the other 19 milliseconds for performing the RF jamming functions.

In the present invention, the operational program of the RF jamming system is modified to permit control by and accept commands from the BAW system control software and operate the affected transmitting antennas in a time sharing or interleaved manner with the primary functions of the RF jamming system. In a preferred embodiment, the one or more transmitting antennas required for the BAWS functionality are dedicated to the BAW function for the transmission time period determined by the BAW system control software.

RWR System

The primary existing function of the RWR system is to identify potential threats to the helicopter. The existing RWR system monitors the RF environment surrounding the helicopter, detects any transmitted RF signals, such as signals transmitted by radar systems, and warns the aircrew of potential threats to the helicopter, providing RF threat situational awareness to the aircrew. The RWR system is often capable of classifying the source of the radar by type of emission, strength of omission, and determines the type of threat posed by the source of the RF signal to the helicopter (e.g., fire control radar guidance for surface-to-air missile).

Existing helicopter RWR systems include at least one RF receiving antenna that is capable of receiving RF signals across a wide spectrum of RF frequencies. Most existing RWR systems typically have multiple RF receiving antennas with each antenna covering a designated sector of the helicopter to provide 360 degrees of coverage around the helicopter. In the first embodiment of the present invention, the radar warning receiver includes four receiving antennas. As shown in FIG. 4, each receiving antenna in the first embodiment has a nominal coverage area of 90 degrees and the coverage areas of the antennas overlap to ensure 360 degrees of coverage for the helicopter. The RWR system usually has a visual display which provides the crew with information such as threat type, intermitted mode and threat angle or angle of arrival (AOA) information.

For the BAW functionality of the present invention, the RWR system, when commanded to do so by the BAW system control software, listens for RF signals at designated frequencies that include reflected RF signals from the RF pulse trains transmitted by the RF jamming system, using the one or more receiving antennas covering the sector that includes the bearing of the HFI detected weapon firing. The RWR listens for reflected RF signals at the designated frequencies for the specified time periods. If the RWR detects RF signals at the designated frequencies, the detected RF signals are processed to determine if any reflected RF signals from the RF pulse trains transmitted by the RF jamming system are present, and also to indicate whether the projectile(s) from the detected weapon firing are approaching (targeting) the helicopter.

Figure 5:
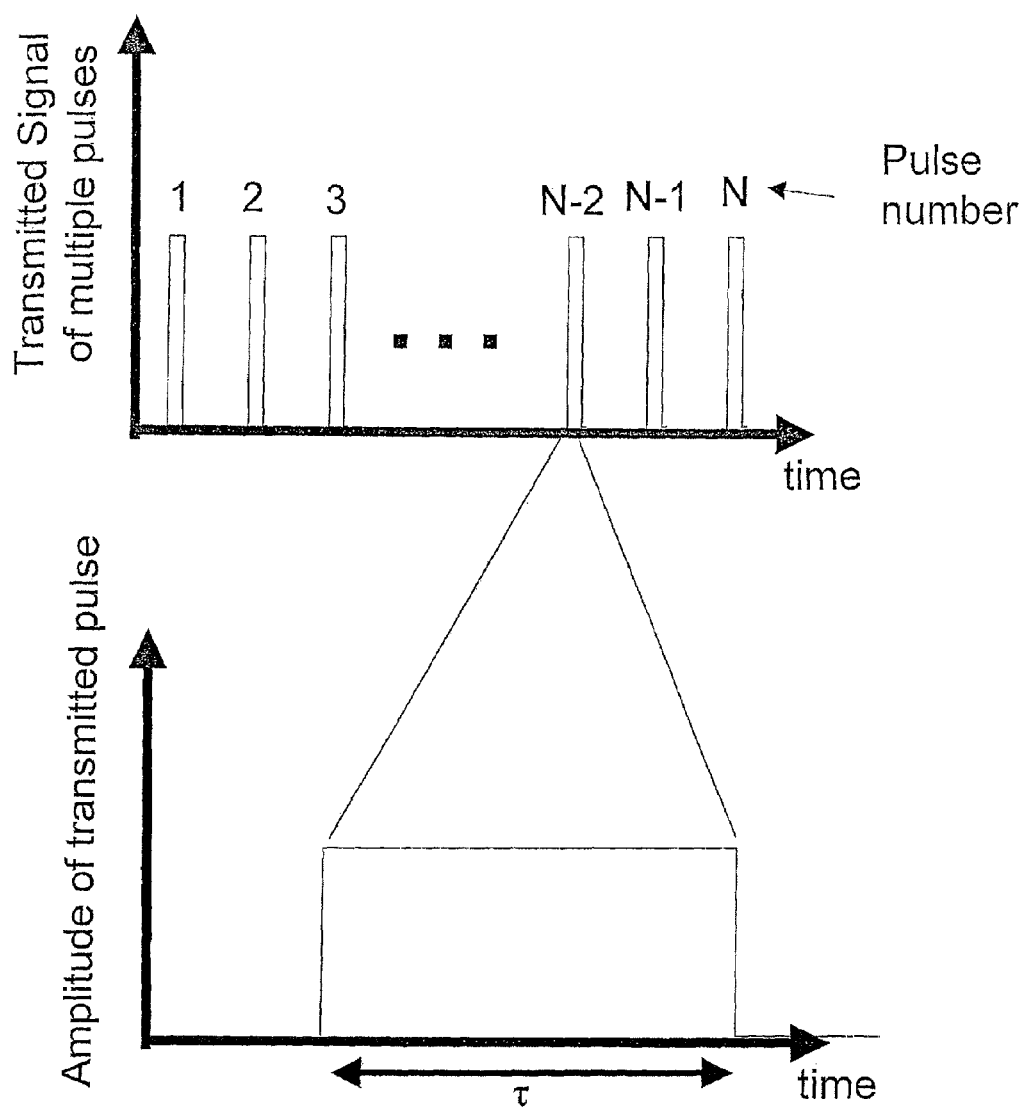
FIG. 5 depicts an example of the transmitted RF pulses (pulse train) and the minimum detection distance of the present invention.

Reflected RF signals detected by the receive antenna will look similar to the RF signal pulses (pulse trains) transmitted by the RF jamming system, but the detected reflected signal will (a) have a smaller amplitude, (b) be delayed by the amount of time required for the pulse to travel from the transmitter to the bullet and back to the receiver, and (c) have a frequency that is slightly shifted from the transmitted RF signal due to the Doppler effect, as shown in FIG. 5. If RF signals are detected at the specified frequencies, the detected RF signals are processed to determine whether any reflected RF pulses (pulse trains) from the RF signal transmitted by the RF jamming system are present.

To determine whether any reflected RF signals are present in the received RF signals, the signal processor of the RWR initially de-clutters, or filters, the received RF signals using one or more filtering techniques, including Doppler and/or range-gate filtering, to remove undesired clutter from the ground and buildings, for example, that may be present with the reflected RF signals. After the received RF signal is de-cluttered the remaining detected RF signals, primarily reflected RF signal pulses, are integrated using either coherent or non-coherent integration. In embodiments of the present invention having the RF jamming and RWR systems as a single integrated EW system, as shown in FIG. 2, coherent integration is used. Where reflected RF signals are detected, the projectiles fired from the small arms weapons are entering and/or transiting through the BAW detection area of the present invention, indicating that the bullets are targeted at the aircraft.

Where the integrated detected RF signal (i.e., integrated reflected RF pulses from the transmitted signal) exceeds a pre-determined detection threshold, the RWR signal processor generates a bullet detection warning message to the BAW system control software and the BAW system control software generates and outputs a bullet approach warning message.

The BAW system control software generated bullet approach warning message provides a warning to the aircrew of the small arms projectile threat. The bullet approach warning may be an aural warning, a visual warning or a combination of aural and visual warnings. The bullet approach warning may also be used for initiating automatic countermeasures against the threat.

In the embodiment of the present invention shown in FIG. 3, which includes a stand alone RF jamming system and a separate stand alone RWR system, non-coherent integration is used. In the embodiment of FIG. 3, the RWR signal processor would use non-coherent integration because using the unsynchronized reference frequencies of the separate RF jamming and RWR systems will only permit non-coherent pulse integration of the detected RF signals. To increase the probability of detection of reflected RF signals, range gating and frequency agility techniques can be used to separate desired signals from clutter signals. In this embodiment, where the integrated detected RF signal exceeds a predetermined detection threshold, the RWR signal processor generates a bullet detection message to the BAW system control software and the BAW system control software generates a bullet approach warning message.

The BAW functionality has minimal impact on the RWR system's performance of its primary functions because typically only a single RF receiving antenna is required for the BAW functionality and the affected RF receiving antenna can perform the BAW RF signal receiving (listening) function in parallel with its primary function. Further, where the BAW system detects the projectile with the first RF signal transmission, the actual time required for the receiving antenna to perform the BAW function for a bullet can be as short as 1 millisecond to detect a projectile approaching the helicopter. For example, using the example discussed above, the duration of the time periods for listening for reflected RF signals are 1 msec. in duration (i.e., length). In this example, the receiving antenna listens at the designated frequencies for reflected RF signals 1 msec. out of every 20 msec. during a maximum time period of 1.1 sec. However, many RWR/ESM systems can simultaneously listen to multiple frequencies from the same or multiple antennas. Unlike the RF jamming system, which can only transmit one RF frequency at a time, the RF receivers of some RWR/ESM can continue to perform the primary RWR/ESM function, albeit with fewer receiver resources, in parallel with the BAW functionality.

In the present invention, the operational program of the RWR system is modified to permit control by and accept commands from the BAW system control software and enable time shared or interleaved use of the RWR signal processor for performing the de-cluttering and integration of the received RF signals for the BAW functionality. In a preferred embodiment the selected receiving antenna(s) and RWR signal processor are dedicated to the BAW functionality for the time period determined by the BAW system control software.

BAW System Control Software

In the system of the present invention, the BAW system control software receives the bearing information for the location of the detected weapon firing that is output by the HFI system. The BAW system control software uses the bearing information and aircraft navigation data to determine which antenna or antennas of the RF jamming system and the RWR system will be used for transmitting and receiving RF signals in the sector including the bearing of the detected weapon firing.

Figure 6:
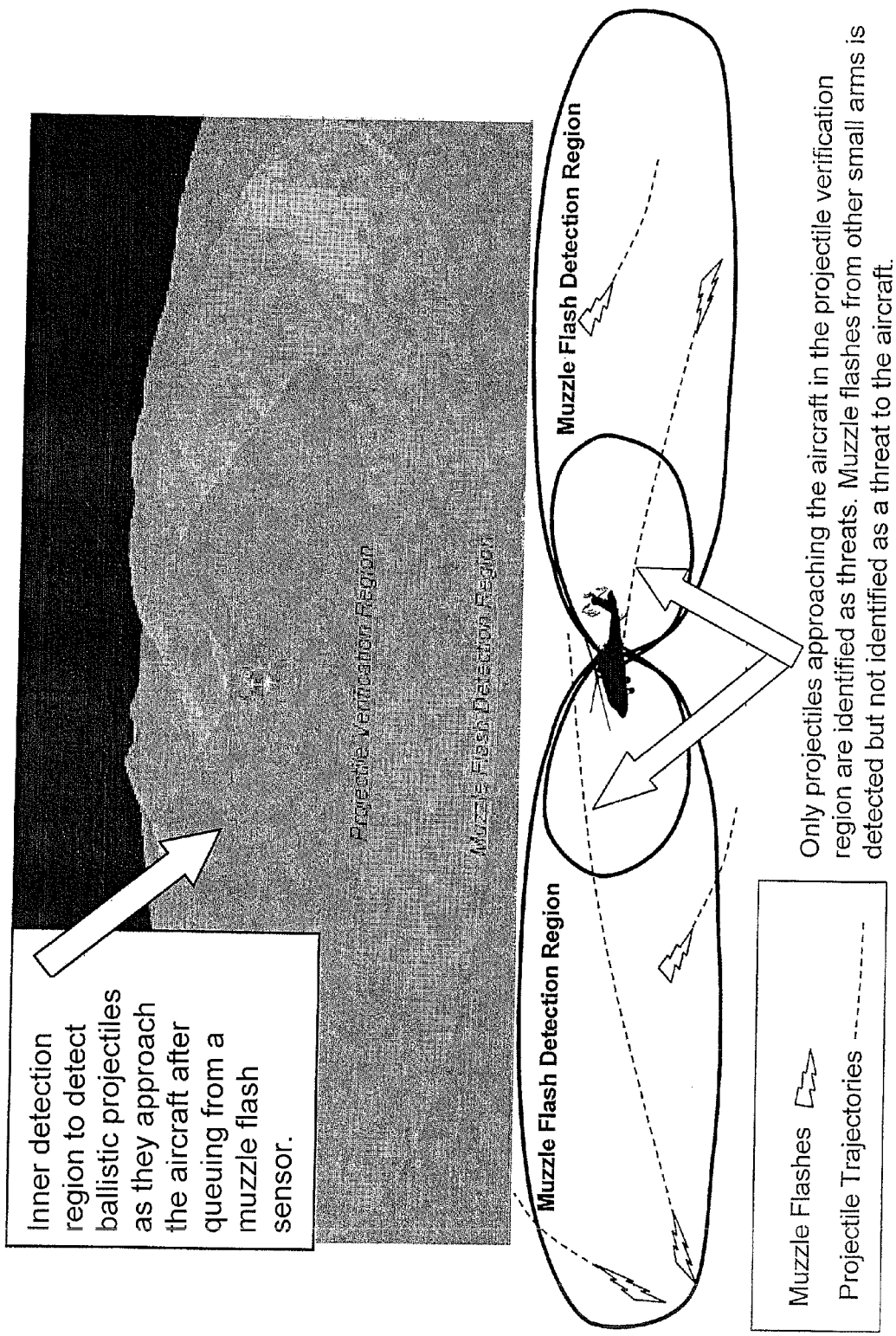
FIG. 6 depicts a BAW detection area around a helicopter (360 degrees)

The BAW system control software determines the earliest expected time of arrival for the bullet to enter the BAW detection area, or envelope. An example of a 360-degree BAW detection area around a helicopter is shown in FIG. 6. The BAW system control software calculates the bullet's earliest expected arrival time within the BAW detection area from aircraft navigation system data, including helicopter position and terrain elevation data, bearing data for the detected weapon firing (e.g., muzzle flash), and the muzzle velocity data for weapons of interest. Weapons of interest include weapons anticipated to be in the area (intelligence briefing) and weapons having similar characteristics to the detected weapon firing. The muzzle velocity data is stored in the memory of at least one of the RF jamming and RWR systems and is accessible to the BAW system control software.

The maximum detection range (distance) from the helicopter for detecting a bullet or small projectile is dependent on the radar cross section of the bullet or small projectile. The BAW functionality also has a minimum detection range (distance) for detecting approaching bullets or small projectiles. The BAW minimum detection range is determined from the width of the transmitted RF signal pulse (pulse train). An example of the calculations for maximum detection range and minimum detection range for a 5.56 mm bullet is provided later in this specification. The calculated maximum detection range and minimum detection range define the inner and outer boundaries of the bullet approach detection area provided by the BAW functionality. The volume or area of the bullet approach detection area of the BAW functionality varies based upon the size (i.e., radar cross section) of the fired projectile.

After determining the size of the BAW detection area, the BAW system control software uses the calculated velocity for the fired projectile to determine the timing, duration and sequencing for transmitting RF signals and for listening for reflected RF signals during the detection time period available (i.e., within the BAW detection area). The detection time period is bounded by the maximum detection range (i.e., calculated earliest time of arrival of the projectile in the BAW detection area) and the minimum detection range of the BAW functionality. Based on the volume or area of the BAW detection area, the BAW system control software segments the available detection time period into time segments and allocates the time segments for either transmitting RF pulses or receiving RF signals, including reflected RF signals. The BAW system control software allocates the available time segments so that the transmitted RF pulses intersect the ballistic trajectory of the bullet at the calculated maximum range (i.e., earliest expected arrival time of bullet within the BAW detection area) and continue until the bullet is beyond the calculated minimum detection range, to provide the maximum number of bullet detection opportunities. The RF jamming system will begin transmitting RF pulses (pulse trains) before the earliest expected arrival time of bullet within the BAW detection area to detect the bullet at the BAW maximum detection range and continue to transmit during each of the allocated time segments until the bullet is detected or the time until the ballistic trajectory of the bullet has passed beyond the calculated minimum detection range is exceeded. The BAW functionality does not continue the transmission of RF signals for a single detected muzzle flash after the bullet has been detected.

Figure 8:
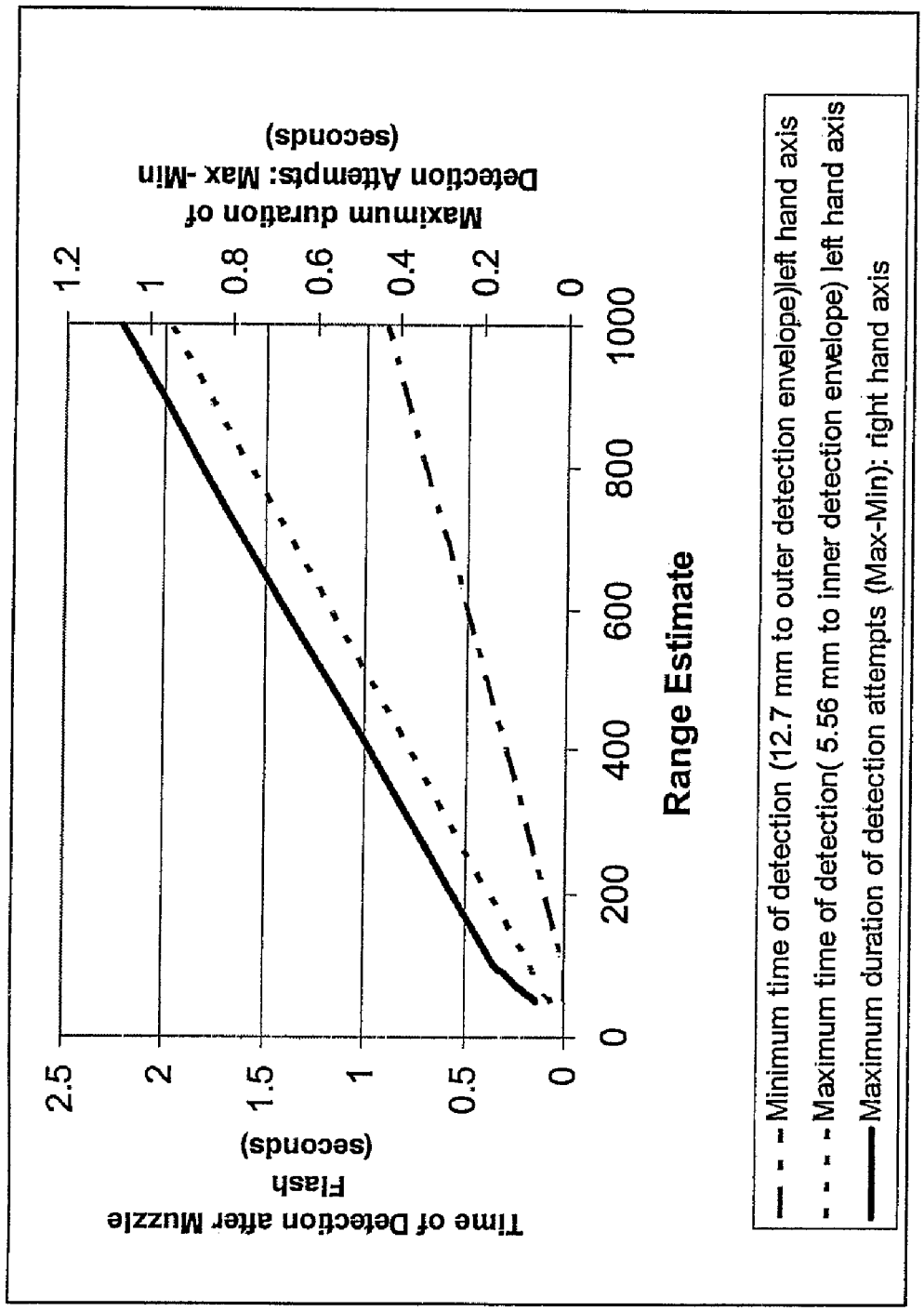
FIG. 8 depicts the detection range and detection opportunities for two different projectiles.

Using the example discussed previously, due to the uncertainty concerning the initial velocity of the projectile, the BAW system functionality begins looking for the projectile when the fastest bullet is at 100 meters, the maximum detection range of the BAW functionality in this example, and stops looking for the projectile two seconds after the muzzle flash detection, when the slowest bullet would have exceeded the minimum detection range of the BAW system functionality. The minimum detection range is based on the pulse width (PW) of the signal transmitted. If a pulse width of 0.1 microseconds is assumed, then the minimum distance is 15 meters. If the velocity range of the bullet is 500 m/sec. to 1000 m/sec., then the maximum time to detect, the minimum time to detect, and the difference between the two are shown in FIG. 8.

The coordination, integration and sequencing of the RF transmitting time segments and RF receiving time segments is important to the BAW functionality of the present invention. The receiving antenna cannot listen for a reflected pulse while the transmitting antenna is transmitting an RF pulse because the strength of the transmitted signal will mask any reflected RF pulse that may be received and may also damage the receiving antenna. In addition to the time segment allocations, the BAW system control software determines the characteristics, such as pulse width (PW) and pulse repetition frequency (PRF) of the RF signal transmitted by the RF jamming system to maximize the number of detection opportunities available for detecting an approaching bullet within the detection area.

After allocating the available time segments, the BAW system control software commands the RF jamming system to transmit RF pulses (pulse trains) having a specified pulse width and periodicity at a specified frequency during the time segments allocated for transmitting RF pulses, and commands the RWR system to listen (receive) for RF signals within a specified RF frequency band during the time segments allocated for receiving RF signals. Any detected RF signals are processed as previously discussed.

In the embodiment shown in FIG. 2, the BAW system control software executes on one or more of the existing processors of the integrated RF jamming and RWR system. The single integrated EW system, including RF jamming and RWR systems, is a preferred embodiment of the present invention because the use of a common reference frequency in the integrated EW system enables coherent pulse integration, which significantly increases the probability of detection of bullets that are approaching the helicopter. The BAW system control software controls the RF jamming system and RWR by transmitting messages directly to the RF jamming system and RWR or transmitting the messages using an aircraft data bus. In another embodiment of the present invention, the BAW system control software communicates with the RF jamming system and RWR via a wireless communications link.

In another embodiment shown in FIG. 3, the existing (RF) jamming system and RWR system onboard the helicopter are separate, stand alone systems. In the embodiment shown in FIG. 3, the BAW system control software executes on one or more of the existing processors of the RF jamming system and one or more of the existing processors of the RWR system. The BAW system control software controls the RF jamming system and RWR by transmitting messages to the RF jamming system and RWR using an aircraft data bus. In another embodiment of the present invention, the BAW system control software communicates with the RF jamming system and RWR via a wireless communications link.

Bullet Approach Warning

The bullet approach warning message generated by the BAW system control software can be transmitted to at least one of the aircraft operational flight program and the aircraft controls and displays subsystem for display on at least one multifunction display in the helicopter. The bullet approach warning message may also be transmitted to a dedicated display, such as an existing HFI display. The bullet approach warning message is also stored in the memory of the RF receiving system for subsequent analysis.

The visual warning display may identify the general direction (e.g., sector of the aircraft the bullet is approaching) or may include the bearing of the approaching bullet. The visual display may also include the estimated time until impact. The warning may also include audible warning tones that are transmitted to one or more of the aircrew via the existing helicopter communications systems. The warning may include a combination of visual and aural warnings.

Example of BAW Functionality Sequence of Operation

In the embodiment of the present invention shown in FIG. 2, the following sequence of steps or events is one example of the operating sequence of the BAW functionality of the present invention:

- (a) The HFI system detects a weapon firing in the vicinity of the helicopter and sending a message that a weapon firing has been detected with the bearing (direction) of the detected weapon firing from the helicopter
- (b) The BAW system control software determines the earliest expected time of arrival for the bullet to enter and expected time to transit through the detection envelope provided by the BAW functionality. This time period is the detection window time period of the BAW functionality.
- (c) The BAW system control software determines which transmit antenna(s) of the RF jamming system and receive antenna(s) of the RWR cover the sector including the bearing of the HFI detected weapon firing.
- (d) The BAW system control software determines the timing sequence for transmitting RF signals from the transmitting antenna(s) of the RF jamming system and for listening for reflected RF signals with the RF receiving antenna(s) during the detection window time period.
- (e) The BAW system control software commands the RF jamming system to transmit N pulses at a designated frequency, creating a pulse train, and at a specified periodicity to detect the bullet during the detection window time period, using the transmitting antenna(s) providing coverage of the sector including the bearing of the detected weapon firing. The RF jamming system transmits the specified pulses at the designated frequency for the specified time periods during the detection window time period.
- (f) Concurrently, the BAW system control software commands the Radar Warning Receiver system to listen for reflected RF signals at designated frequencies during specified time period within the detection window time period using the receive antenna(s) providing coverage of the sector including the bearing of the detected weapon firing. The RWR listens for reflected RF signals at the designated frequency for the specified time periods during the detection window time period
- (g) If the RWR detects RF signals at the designated frequencies, the signal processor of the RWR de-clutters, or filters, the detected RF signals, and then integrates the remaining detected RF signals using coherent or non-coherent integration techniques.

Example of Maximum and Minimum Detection Range Calculations

The strength of the signal reflected from the bullet is a function of frequency and the bullet size. For bullets ranging from 5.56 mm to 12.7 mm, the radar cross section is as small as $1\times10^{-5}$ and as large as $1\times10^{-3}$ square meters in the typical electronic warfare frequency bands. To detect these small targets, many pulses will have to be integrated to obtain a signal that is above the noise threshold level. The bullet needs to reflect the RF pulses during its transit through the detection area. The pulse integration time for detecting the bullet is defined from the earliest entry time for the duration of transit time. The distance the bullet travels during this integration time is determined as follows:

(velocity)×(time between pulses)×(number of pulses)

For typical bullet velocity of 700 meters per second, and 1 microsecond between pulses, and 1000 pulses, the distance the bullet travels is 0.7 meters.

The maximum distance at which the bullet can be detected is governed by the radar range equation, which is known in the art and can be found in many texts. The radar range equation includes many factors that describe the radar system and the target being detected. A common representation of the radar range equation can be found, as equation 2.11, in the radar handbook reference[1], from which the following equation, which represents a coherent detection radar system, can be derived:

$$R_{max} = 239,300 \left[ \frac{P_{t(kW)} N \tau_{\mu s} G_t G_r \sigma F_t^2 F_r^2}{f_{MHz}^2 T_S D_{onepulse} C_B L} \right]^{1/4} \text{ meters}$$

where:
N is the number of pulses integrated;
$D_{onepulse}$ is the single pulse detectability factor, and the remaining factors are as defined in the Radar Handbook.

Using: $G_t=1$;
$\sigma=1E-5$ m$^2$ (representing a 5.56 mm bullet);
$F_t=1$
$F_r=1$
$f_{MHz}=15E3$
$T_s=290K$
$D_{onepulse}=15$ (corresponding to probability of detection of 0.9 and probability of false alarm of $1\times10^{-4}$), and
$C_b=1$.

[1]Radar Handbook, Merrill I Skolnik, 2$^{nd}$ edition, Mcgraw-Hill 1990

Figure 9:
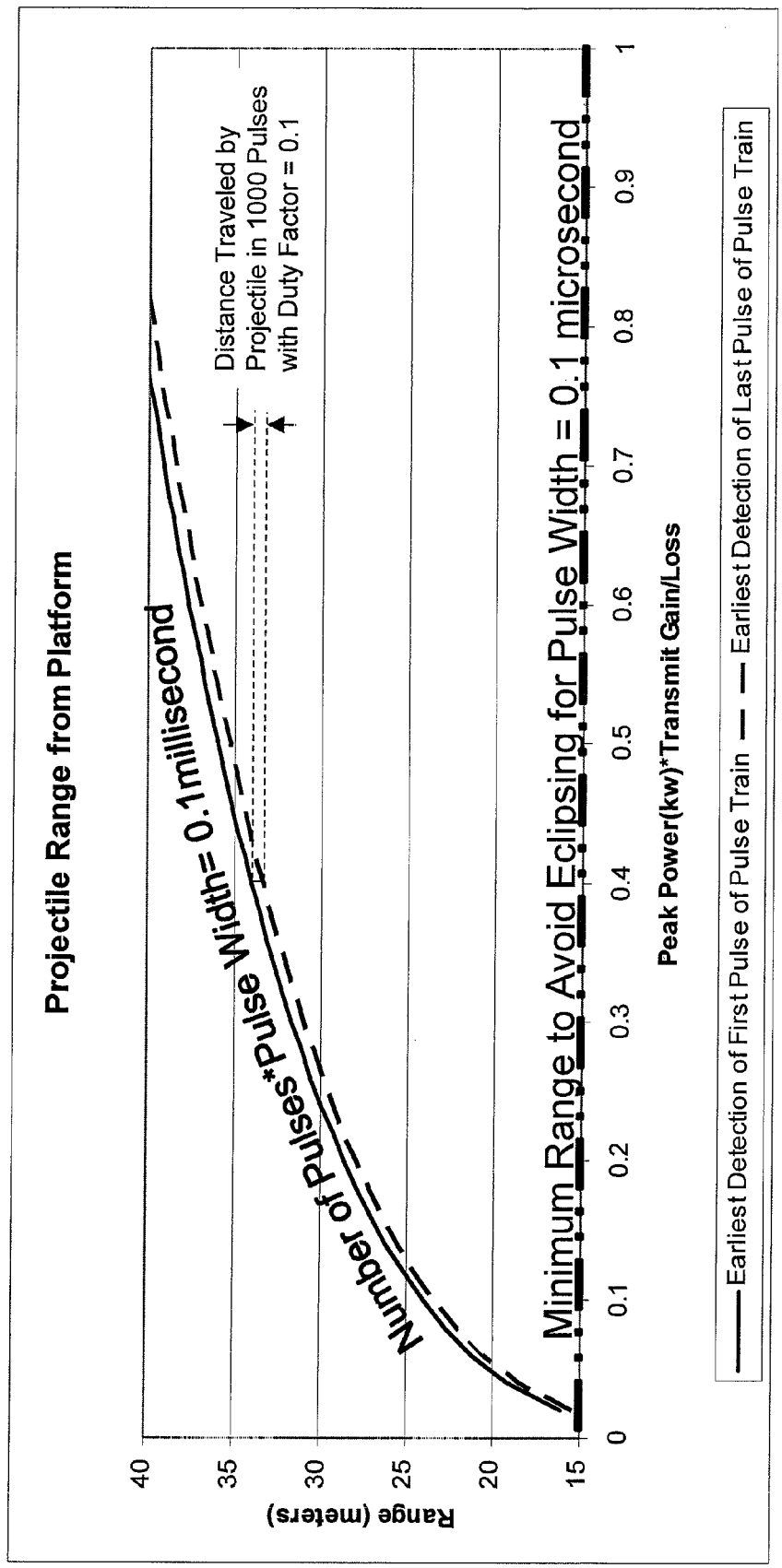
FIG. 9 depicts the maximum detection range for a 5.56 mm bullet.

For typical systems, the solid line shown in FIG. 9 depicts a plot of the maximum range as a function of the remaining factors. The dashed line shown in FIG. 9 depicts the range of a projectile traveling at 700 m/s after the first complete integration period on N pulses. This example applies to the smallest caliber projectile that is typically of interest in the battlefield. Larger caliber projectiles can be detected at longer ranges.

The BAW system control software also determines the minimum detection distance for the earliest reflected signal (off of the bullet) to arrive at the receiving antenna. This minimum distance is determined by $d_{min}=T*c/2$, where:
c is the velocity of light, and
T is the transmitted pulse width Example of Detection Range For 5.56 mm Bullet For example, the detection range of the BAW functionality of the present invention for a 5.56 mm bullet (worst case) is provided below.

Using a transmitted RF signal pulse having a 0.1 microsecond pulse width, the minimum detection distance for a reflected pulse from the 5.56 mm bullet is 15 meters (approximately 45 feet) from the aircraft.

Therefore the detection area, or envelope, of the BAW function for a 5.56 mm bullet is from a few tens of meters, as shown in FIG. 9, to 15 meters away from the helicopter.

Using a 0.1 microsecond pulse width and the range of values shown in FIG. 9, the number of pulses trains (groups of pulses) that the RF transmitting antenna could transmit and the RF receiving antenna could integrate while the 5.56 mm bullet is within the detection area is:

Number of available integration cycles=$(R_{max}-R_{min})/(D_{proj})$

Where:

$R_{max}$=The earliest detection range of first pulse of first pulse train.

$R_{min}$=Minimum range to avoid eclipsing; 15 meters in FIG. 9.

$D_{proj}$=Distance traveled by projectile during transmitted pulse train; 0.7 meters for this example.

For the detection distances shown in FIG. 9, varying from approximately 20 meters to 40 meters, the number of available integration cycles would be between 7 and 35, depending on the available transmitted power of the EW system.

Thus for the example values shown in FIG. 9, the BAW functionality of the present invention would have between 7 and 35 opportunities to detect the 5.56 mm bullet during the time the bullet is within the detection area. As the size of the bullet increases, the width of the detection area and the number of the detection opportunities to detect the bullet increases even further.

We claim:

1. A system for warning a helicopter of an approaching bullet using existing sensor systems, said system comprising:
    means for transmitting an RF signal;
    means for receiving RF signals;
    means for detecting a small arms weapon firing from at least one location in the vicinity of a helicopter;
    means for providing a bearing from said helicopter for said at least one location where said small arms weapon firing was detected;
    means for determining a detection area and detection time window for a bullet fired from said small arms weapon;
    means for determining at least one antenna of said means for transmitting an RF signal and said means for receiving RF signals that are covering a sector including said bearing of said detected small arms weapon firing;
    means for determining a timing sequence and allocating at least one time segment for transmitting said RF signal and at least one time segment for receiving RF signals during said detection time window,
    means for commanding said means for transmitting an RF signal to emit said RF signal at a predetermined frequency during said at least one time segment allocated for transmitting said RF signal;
    means for commanding said means for receiving RF signal to receive RF signals near said predetermined frequency during said at least one time segment allocated for receiving RF signals;
    means for processing RF signals received during said at least one time segment allocated for receiving RF signals;
    means for determining whether an RF signal reflected from said RF signal emitted from said means for transmitting said RF signal is present in said RF signals received during said at least one time segment allocated for receiving RF signals, and
    means for outputting a warning where said RF signal reflected from said RF signal emitted from said means for transmitting said RF signal is detected.

2. The system of claim 1 wherein said means for detecting a small arms weapon firing and providing a bearing from said helicopter comprises a hostile fire indicator.

3. The system of claim 1, wherein said means for transmitting an RF signal comprises an RF jamming system.

4. The system of claim 1, wherein said means for transmitting an RF signal transmits at least one RF signal pulse train at a predetermined periodicity during said at least one time segment for transmitting said RF signal.

5. The system of claim 1 wherein said means for receiving an RF signal comprises one of a radar warning receiver and an electronic support measures system.

6. The system of claim 1, wherein said means for transmitting an RF signal and said means for receiving an RF signal comprise an integrated system and coherent signal integration techniques are used for detecting said RF signal reflected from said RF signal emitted from said means for transmitting said RF signal.

7. The system of claim 6, wherein said means for determining whether an RF signal reflected from said RF signal emitted from said means for transmitting said RF signal comprises at least one signal processor of said integrated system.

8. The system of claim 1, wherein said means for transmitting an RF signal and said means for receiving an RF signal comprise separate systems and non-coherent signal integration techniques are used for detecting said RF signal reflected from said RF signal emitted from said means for transmitting said RF signal.

9. The system of claim 1, wherein said means for determining whether an RF signal reflected from said RF signal emitted from said means for transmitting said RF signal comprises at least one signal processor of said means for receiving RF signals or a dedicated signal processor.

10. The system of claim 1, wherein at least said means for determining a detection area and detection time window, said means for determining a timing sequence and allocating at least one time segment for transmitting said RF signal and at least one time segment for receiving RF signals during said detection time window, said means for commanding said means for transmitting an RF signal to emit said RF signal at a predetermined frequency during said at least one time segment allocated for transmitting said RF signal and said means for commanding said means for receiving RF signals to receive RF signals near said predetermined frequency during said at least one time segment allocated for receiving RF signals comprise at least one software programs running on at least one processor of said means for transmitting said RF signal, said means for receiving RF signals, a helicopter mission systems processor, a helicopter flight systems processor and a dedicated processor.

11. A system for warning a helicopter of an approaching bullet using existing sensor systems, said system comprising:
    an RF transmitting system;
    an RF receiving system;
    a hostile fire indicator for detecting a small arms weapon firing from at least one location in the vicinity of a helicopter and providing a bearing from said helicopter for said at least one location where said small arms weapon firing was detected;
    a warning system, and
    a bullet approach warning functionality, said bullet approach warning functionality comprising:
    means for determining a detection area and detection time window for a bullet fired from said small arms weapon;
    means for determining at least one antenna of said means for transmitting an RF signal and said means for receiving RF signals that are covering a sector including said bearing of said detected small arms weapon firing;

means for determining a timing sequence and allocating at least one time segment for transmitting said RF signal and at least one time segment for receiving RF signals during said detection time window, and means for commanding said means for transmitting an RF signal to emit said RF signal at a predetermined frequency during said at least one time segment allocated for transmitting said RF signal, and means for commanding said means for receiving RF signals to receive RF signals near said predetermined frequency during said at least one time segment allocated for receiving RF signals;

wherein said RF receiving system processes RF signals received during said at least one time segment allocated for receiving RF signals and determines whether an RF signal reflected from said RF signal emitted from said RF transmitting system is present in said RF signals received during said at least one time segment allocated for receiving RF signals, and said warning system outputs a warning where said RF signal reflected from said RF signal emitted from said RF transmitting system is detected.

12. The system of claim 11, wherein said RF transmitting system and said RF receiving system comprise an integrated system and coherent signal integration techniques are used for detecting said RF signal reflected from said RF signal emitted from said RF transmitting system.

13. The system of claim 11, wherein said RF transmitting system and said RF receiving system comprise separate systems and non-coherent signal integration techniques are used for detecting said RF signal reflected from said RF signal emitted from said RF transmitting system.

14. A method for warning a helicopter of an approaching bullet using existing sensor systems, said bullet approach warning method comprising the steps of:

detecting a small arms weapon firing at least one bullet from at least one location in the vicinity of a helicopter;

providing a bearing from said helicopter for said at least one location where said small arms weapon firing was detected;

determining a detection area and detection time window for said at least one bullet fired from said detected small arms weapon firing;

determining at least one antenna of an on-board RF transmitting system and at least one antenna of an on-board RF receiving system that cover a sector including the bearing of said detected small arms weapon firing;

determining a timing sequence and allocating at least one time segment for transmitting an RF signal and at least one time segment for receiving RF signals during said detection time window;

commanding said RF emitting system to emit said RF signal at a predetermined frequency during said at least one time segment allocated for transmitting RF signals, and commanding said RF receiving system to receive RF signals near said predetermined frequency during said at least one time segment allocated for receiving RF signals;

processing said RF signal received during said at least one time segment allocated for receiving RF signals;

determining whether said RF signal received during said at least one time segment allocated for receiving RF signals includes at least one RF signal pulse reflected from said RF signal emitted from said RF emitting system, and outputting a warning where at least one RF signal pulse reflected from said RF signal emitted from said RF emitting system is detected.

15. The method of claim 14, wherein said detecting step detects a muzzle flash from said small arms weapon.

16. The method of claim 14, wherein said RF transmitting system transmits at least one RF signal pulse train at a predetermined periodicity during said at least one time segment for transmitting said RF signal.

17. The method of claim 14, wherein said RF transmitting system and said RF receiving system comprise an integrated system and coherent signal integration techniques are used for detecting said RF signal reflected from said RF signal emitted from said RF transmitting system.

18. The method of claim 14, wherein said RF transmitting system and said RF receiving system comprise separate systems and non-coherent signal integration techniques are used for detecting said RF signal reflected from said RF signal emitted from said RF transmitting system.

19. The method of claim 14, wherein said bullet approach warning method is initiated automatically upon detection of a small arms weapon firing in the vicinity of the helicopter.

20. The method of claim 14, wherein said bullet approach warning method is initiated manually by a crewmember.

* * * * *